United States Patent [19]

Konrath et al.

[11] Patent Number: 4,579,090
[45] Date of Patent: Apr. 1, 1986

[54] COOLING APPARATUS FOR A RADIATOR OF THE DRIVE UNIT OF A VEHICLE

[75] Inventors: Rainer Konrath, Kassel; Willi Rometsch, Vellmar, both of Fed. Rep. of Germany

[73] Assignee: Thyssen Industrie Aktiengesellschaft, Essen, Fed. Rep. of Germany

[21] Appl. No.: 707,092

[22] Filed: Mar. 1, 1985

[30] Foreign Application Priority Data

Mar. 1, 1984 [DE] Fed. Rep. of Germany ....... 3407570

[51] Int. Cl.⁴ .............................................. F01P 9/04
[52] U.S. Cl. ............................. 123/41.02; 123/41.18; 165/41; 180/68.4
[58] Field of Search ................. 123/41.01, 41.02, 41.3, 123/41.4 E, 41.49; 180/68.4, 68.6, 68.1; 165/41, 60

[56] References Cited

U.S. PATENT DOCUMENTS

| | | | |
|---|---|---|---|
| 2,387,485 | 10/1945 | Young et al. | 165/41 |
| 2,439,775 | 4/1948 | Kennedy | 165/41 |
| 3,812,906 | 5/1974 | Panhard | 123/41.01 |
| 4,361,525 | 11/1982 | Leyland | 165/60 |
| 4,488,518 | 12/1984 | Wohlfarth | 123/41.49 |
| 4,492,282 | 1/1985 | Appelblatt et al. | 180/68.4 |

FOREIGN PATENT DOCUMENTS 1455760 11/1969 Fed. Rep. of Germany ..... 180/68.4

Primary Examiner—William A. Cuchlinski, Jr.
Attorney, Agent, or Firm—Becker & Becker

[57] ABSTRACT

A cooling apparatus for a radiator through which a coolant of the drive unit flows, and to which cooling air is supplied. The radiator is disposed in a separate compartment of a vehicle, especially an armored vehicle, and is disposed above a cooling air fan. Openings in the roof and back end of the vehicle for supplying air to, and withdrawing air from, the cooling air fan are provided with gratings. A spraying arrangement is integrated into the separate compartment. This spraying arrangement includes a tube system which extends over the radiator and is spaced therefrom. The tube system is provided with jets for uniformly distributing a cooling liquid. The tube system communicates with a primary supply line, which is provided with a feed pump, a two-way valve, and an intake orifice which is disposed just above the bottom of the vehicle. A cooling liquid reservoir is mounted in the vehicle and is connected via a secondary supply line with the two-way valve. When viewed in the direction of flow of the cooling liquid, the two-way valve is located upstream of the feed pump, and can be switched by means of a control member from driving operation to floating operation.

10 Claims, 1 Drawing Figure

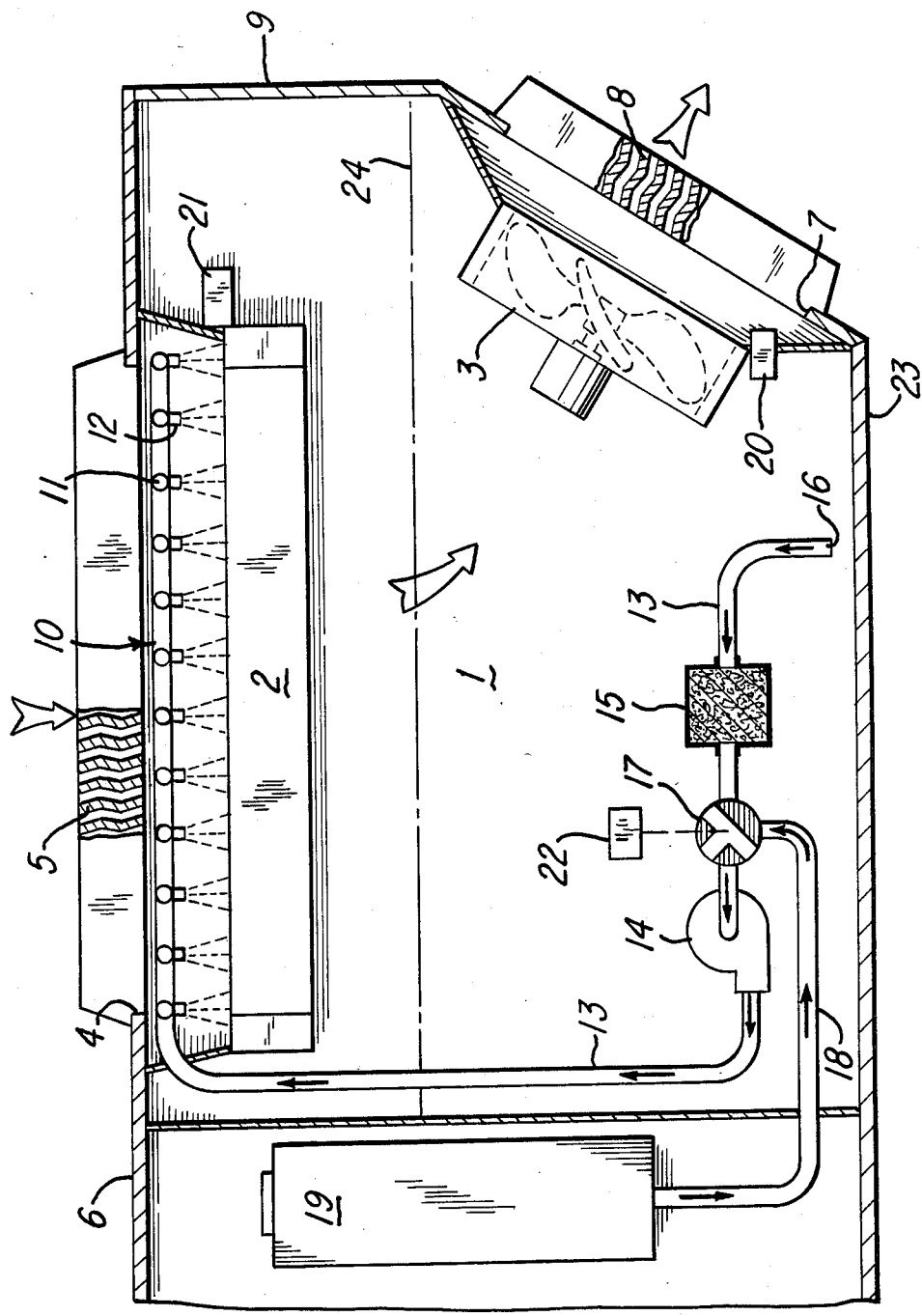

COOLING APPARATUS FOR A RADIATOR OF THE DRIVE UNIT OF A VEHICLE

BACKGROUND OF THE INVENTION

The present invention relates to a cooling apparatus through which a coolant of the drive unit flows, and to which cooling air is supplied; the radiator is disposed in a separate compartment of a vehicle, especially an armored vehicle, above a cooling air fan. Openings in the roof and back end of the vehicle for supplying air to, and withdrawing air from, the cooling air fan are provided with gratings.

A cooling apparatus of the aforementioned general type is disclosed, for example, in German Offenlegungsschrift No. 27 37 595. When driving over terrain under normal conditions, this heretofore known device assures that atmospheric air is supplied to the radiator, and that the cooling air passes through uniformly. Furthermore, by disposing the cooling air fan below the radiator, dust and/or water which is raised or sprayed up from the roadway as the vehicle is moving, cannot be deposited on the housing of the radiator, so that after the water dries, the radiator housing is not covered with dirt, which would adversely affect the cooling. On the other hand, when the vehicle floats or is being driven through water, or when it is being driven through swampy terrains and sinks so deeply that the cooling air which is supposed to be discharged by the cooling air fan through the opening in the back end of the vehicle can no longer force back the water or the mud, the water or mud enters the compartment which houses the radiator and cooling air fan through the opening in the back end of the vehicle, so that the cooling air fan is impaired, or even becomes completely inoperative.

When the cooling air fan fails, regardless of the cause, the radiator is no longer cooled by cooling air, so that if the engine of the drive unit continues to be operated, and if no overheating protection is provided to switch off the engine, there exists the danger that the engine will overheat. As a result, the mission of the vehicle is impaired.

It is therefore an object of the present invention to improve the cooling apparatus of the aforementioned general type in such a way that continuous cooling of the radiator, through which the coolant of the drive unit flows, is assured regardless of the driving or floating state at any given time.

BRIEF DESCRIPTION OF THE DRAWING

This object, and other objects and advantages of the present invention, will appear more clearly from the following specification in conjunction with the accompanying drawing, which is a schematic longitudinal section through the back end of a partially illustrated vehicle, and shows one embodiment of the inventive cooling apparatus.

SUMMARY OF THE INVENTION

The cooling apparatus of the present invention is characterized primarily by a spraying arrangement which is integrated in the separate compartment. This arrangement comprises a tube system which extends over the radiator and is spaced therefrom. The tube system is provided with jets for uniformly distributing a cooling liquid. The tube system furthermore communicates with a primary supply line, which is provided with a feed pump, a two-way valve, and an intake orifice which is disposed just above the bottom of the vehicle. A cooling liquid reservoir, which is mounted in the vehicle, is connected via a secondary supply line with the two-way valve. When viewed in the direction of flow of cooling liquid, this valve is located upstream of the feed pump, and can be switched by means of a control member from driving operation to floating operation.

One of the particular advantages achieved with the present invention is that by integrating the spraying arrangement for the radiator into the heretofore known structural radiator components, the radiator can be safely operated, at least for a certain period of time, even when the air-cooling fails, by spraying the radiator with a cooling liquid. A further advantage is that the cooling liquid for the spraying arrangement can be obtained either from the liquid which has accumulated in the separate compartment, or from a reservoir which is mounted in the vehicle.

In addition to these advantages, there is obtained the further advantage that the grating in the roof of the vehicle can be more easily constructed if the spraying arrangement tubes, which are provided with jets, are disposed along the roof of the vehicle below the opening which allows air to be supplied to the separate compartment.

Pursuant to specific advantageous embodiments of the present invention, the tube system of the spraying arrangement can be provided with a plurality of tubes which are disposed in a plane and at equal intervals relative to one another. The tube system can be in the form of a cooling coil.

A filter can be associated with the intake orifice of the primary supply line, for instance being disposed between the orifice and the two-way valve.

A plurality of sensors can be provided in the separate compartment to effect automatic turning on and off not only of the cooling air fan but also of the spraying arrangement.

The spraying arrangement can be provided with a mechanical, electrical, or hydraulic drive, with control thereof being carried out either manually or automatically.

DESCRIPTION OF PREFERRED EMBODIMENTS

Referring now to the drawing in detail, a radiator 2 for cooling the coolant of a drive unit (not illustrated) is disposed in a separate compartment 1 in the back end of an only generally indicated vehicle. Also located in the separate compartment 1, below the radiator 2, is a cooling air fan 3 which draws in atmospheric air through an opening 4 in the roof 6 of the vehicle; this air is supplied to the radiator 2. In such an arrangement, the drawn-in air absorbs the heat which is given off by the radiator 2, and subsequently flows back into the atmosphere through an opening 7 in the back end 9 of the vehicle. The direction of flow of the cooling air is indicated by arrows. Each of the openings 4, 7 in the housing of the vehicle for supplying air to, and withdrawing air from, the cooling air fan 3 is provided with a known grating 5, 8. A spraying arrangement is also installed in the separate compartment 1; as part of this arrangement, a tube system 10 for a cooling liquid is disposed above, and is spaced from, the radiator 2. This tube system 10 essentially comprises tubes 11 which are disposed in a plane at equal intervals from one another; the tubes 11 are provided with jets 12. The tube system 10 is also connected to a primary supply line 13, which in turn is connected to a feed pump 14, and at its free end has an intake orifice 16. Connected to the primary supply line 13, upstream of the feed pump 14 when viewed in the direction of flow, which is indicated by arrows, is a secondary supply line 18 which extends from a cooling liquid reservoir 19 which is connected to the vehicle; the secondary supply line 18 is provided with a two-way valve 17 and a control member 22. Depending upon the position of the switchable two-way valve 17, cooling liquid can be supplied to the tube system 10 of the spraying arrangement, via the primary supply line 13, either from the separate compartment 1 or from the reservoir 19.

In order to utilize, as cooling liquid, the liquid which enters the separate compartment 1, the primary supply line 13 is provided with a filter 15 in the region of its intake orifice 16, which is located just above the bottom 23 of the vehicle.

To automatically turn the cooling air fan 3 and the spraying arrangement on and off, a number of sensors 20, 21 are located in the compartment 1. The drive for the feed pump 14 can be effected either mechanically from the drive unit, or also electrically or hydraulically. The control for the spraying arrangement can be carried out either manually or automatically. The reference numeral 24 indicates the level of liquid which has entered the separate compartment 1 of the vehicle.

The apparatus of the present invention operates as follows:

1. When, for example while driving through water or floating, water enters the separate compartment 1 through the opening 7 in the back end of the vehicle, and reaches the level of the sensor 20, the spraying arrangement is turned on. At the same time, the cooling air fan 3 is turned off. By means of the control member 22, the two-way valve 17 is switched in such a way that the feed pump 14, via the primary supply line 13, supplies cooling liquid from the compartment 1 to the tube system 10. The cooling process is thus assured by the spraying arrangement. If the water in the compartment 1 reaches the level of the sensor 21, the spraying arrangement is turned off, because cooling of the radiator 2 is assured by the water which is now flowing around it. When the water level in the compartment 1 falls, the switching functions of the sensors 20, 21 are effected in the reverse sequence.

2. When the cooling air fan 3 fails while driving over dry land or in swampy terrain, the control member 22 switches the two-way valve 17 into the position in which the primary supply line 13 receives the cooling liquid via the secondary supply line 18 from the reservoir 19, whereupon the feed pump 14 conveys the cooling liquid to the tube system 10. After the reservoir 19 has been emptied, the control member 22 switches the two-way valve 17 in such a way that the cooling liquid, which passes from the tube system 10 over the radiator 2 into the trough-like portion of the bottom 23 of the vehicle, is picked up by the intake orifice 16 of the primary supply line 13, is resupplied to the tube system 10, and is thus circulated.

The present invention is, of course, in no way restricted to the specific disclosure of the specification and drawing, but also encompasses any modifications within the scope of the appended claims.

What we claim is:

1. A cooling apparatus for a radiator through which flows a coolant of a drive unit, and to which cooling air is supplied; said radiator is disposed in a separate compartment of a vehicle, and is disposed above a cooling air fan; openings are provided in the roof and in the back end of said vehicle to permit air to be supplied to, and withdrawn from, said cooling air fan; said openings are provided with gratings, and said vehicle has a bottom;

the improvement comprises a spraying arrangement, which is integrated into said separate compartment and includes:

a tube system which is adapted to receive cooling liquid, and which extends over said radiator and is spaced therefrom, with said tube system being provided with jets for uniformly distributing a cooling liquid over said radiator;

a primary supply line which communicates with said tube system to supply cooling liquid thereto, and which is provided with: a feed pump, a two-way valve which, when viewed in the direction of flow of cooling liquid through said primary supply line, is disposed upstream of said feed pump, and an intake orifice which is disposed just above said bottom of said vehicle for receiving cooling liquid which might be present in said separate compartment;

a cooling liquid reservoir which is mounted in said vehicle;

a secondary supply line, which leads from said reservoir to said two-way valve to supply cooling liquid from said reservoir to said primary supply line; and a control member for switching said two-way valve to selectively establish communication from said intake orifice to said tube system, or from said cooling liquid reservoir to said tube system.

2. A cooling apparatus according to claim 1, in which said tube system includes a plurality of tubes, which are disposed in a plane at equal intervals from one another, and to which said jets are connected.

3. A cooling apparatus according to claim 2, in which said tube system is in the form of a cooling coil.

4. A cooling apparatus according to claim 2, in which a filter is disposed in said primary supply line between said intake orifice and said two-way valve.

5. A cooling apparatus according to claim 2, which includes a plurality of sensors disposed in said separate compartment for effecting an automatic activation and deactivation not only of said cooling air fan, but also of said spraying arrangement.

6. A cooling apparatus according to claim 2, which includes a mechanical drive mechanism for said spraying arrangement.

7. A cooling apparatus according to claim 2, which includes an electrical drive mechanism for said spraying arrangement.

8. A cooling apparatus according to claim 2, which includes a hydraulic drive mechanism for said spraying arrangement.

9. A cooling apparatus according to claim 2, which includes manual control means for said spraying arrangement.

10. A cooling apparatus according to claim 2, which includes automatic control means for said spraying arrangement.

* * * * *